US008217882B2

(12) United States Patent
Wen et al.

(10) Patent No.: US 8,217,882 B2

(45) Date of Patent: Jul. 10, 2012

(54) LIQUID CRYSTAL DISPLAY WITH DATA COMPENSATION FUNCTION AND METHOD FOR COMPENSATING DATA UTILIZING ISOLATED COUPLING LINES

(75) Inventors: Yi-Chien Wen, Hsin-Chu (TW); Chi-Mao Hung, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 772 days.

(21) Appl. No.: 11/954,241

(22) Filed: Dec. 12, 2007

(65) Prior Publication Data

US 2009/0102997 A1 Apr. 23, 2009

(30) Foreign Application Priority Data

Oct. 22, 2007 (TW) ............................... 96139497 A

(51) Int. Cl.
*G09G 3/36* (2006.01)
*G06F 3/038* (2006.01)

(52) U.S. Cl. ............................. 345/96; 345/209; 345/93

(58) Field of Classification Search .................... 345/87, 345/90, 93–96, 103, 204–206, 208–215
See application file for complete search history.

(56) References Cited

U.S. PATENT DOCUMENTS 4,485,380 A * 11/1984 Soneda et al. .................. 345/58
6,271,816 B1 * 8/2001 Jeong et al. ...................... 345/87
2007/0132684 A1 * 6/2007 Baek et al. ....................... 345/87
2008/0129906 A1 * 6/2008 Lin et al. ......................... 349/38

FOREIGN PATENT DOCUMENTS

TW 425539 3/2001

* cited by examiner

*Primary Examiner* — Bipin Shalwala
*Assistant Examiner* — Keith Crawley
(74) *Attorney, Agent, or Firm* — Winston Hsu; Scott Margo

(57) ABSTRACT

An liquid crystal display with data compensating function includes a plurality of gate lines, a plurality of first data lines, a plurality of second data lines, a pixel array, a first common end, a second common end, a plurality of first coupling lines, and a plurality of second coupling lines. The first coupling lines are disposed correspondingly near the first data lines, and are coupled to the first common end. The second coupling lines are disposed correspondingly near the second data lines, and are coupled to the second common end. The first common end carries voltages having same polarity as those of the first data lines for driving the first coupling lines. The second common end carries voltages having same polarity as those of the second data lines for driving the second coupling lines. The first common end is isolated from the second common end.

11 Claims, 13 Drawing Sheets

LIQUID CRYSTAL DISPLAY WITH DATA COMPENSATION FUNCTION AND METHOD FOR COMPENSATING DATA UTILIZING ISOLATED COUPLING LINES

BACKGROUND OF THE INVENTION

1. Field of the Invention

The present invention relates to a liquid crystal display (LCD), and more particularly, to an LCD with data compensation function.

2. Description of the Prior Art

In an LCD, the cost of the source driver is much higher than the gate driver. In order to reduce the total cost of the LCD, the structure of pixels sharing data lines is generated. In the structure of pixels sharing data lines, the data lines are reduced by half; in this way, the amount of source drivers is reduced, which will lower the total cost. However, due to this structure, the amount of the gate drivers will be doubled and the frequency of the gate driving signals also has to be doubled for keeping the same frame rate. In other words, the turning-on period of a gate is reduced by half. Under such conditions, the data lines cannot be fully charged or discharged to the predetermined voltage levels. Therefore, in the prior art, coupling lines are disposed near the data lines to increase driving abilities of the data lines.

FIG. 1 is a diagram illustrating coupling lines of a conventional LCD. As shown in FIG. 1, the pixel $P_{xy}$ is coupled to the data line $D_y$ and the gate line $G_x$, and the pixel $P_{(x+1)y}$ is coupled to the data line $D_y$ and the gate line $G_{(x+1)}$. The left side of the pixel $P_{xy}$ is disposed with a coupling line $CP_1$, which is a metal line. In this way, a parasitic capacitor $C_{pd1}$ is formed between the coupling line $CP_1$ and the pixel $P_{xy}$. The right side of the pixel $P_{(x+1)y}$ is disposed with a coupling line $CP_2$, which is also a metal line. In this way, a parasitic capacitor $C_{pd2}$ is formed between the coupling line $CP_2$ and the pixel $P_{(x+1)y}$. The voltages on the pixels $P_{xy}$ and $P_{(x+1)y}$ are affected by the voltages of the coupling lines $CP_1$ and $CP_2$. Therefore, the voltages on the pixels $P_{xy}$ and $P_{(x+1)y}$ can be adjusted by controlling the voltages of the coupling lines $CP_1$ and $CP_2$; consequently, the driving ability of the data line $D_y$ is improved.

FIG. 2 is a diagram illustrating a conventional LCD with data compensation function. As shown in FIG. 2, a coupling line is disposed between every two data lines. For example, the coupling line $CP_1$ is disposed between the data lines $D_1$ and $D_2$, the coupling line $CP_2$ is disposed between the data lines $D_2$ and $D_3$, the coupling line $CP_n$ is disposed between the data lines $D_n$ and $D_{(n+1)}$, and so on. The coupling line $CP_1$ is disposed between the data lines $D_1$ and $D_2$, and thus the pixels which are affected by the coupling line $CP_1$ comprise pixels $P_{21}$, $P_{12}$, $P_{41}$, $P_{32}$, and so on. The coupling line $CP_2$ is disposed between the data lines $D_2$ and $D_3$, and thus the pixels which are affected by the coupling line $CP_2$ comprise pixels $P_{22}$, $P_{13}$, $P_{42}$, $P_{33}$, and so on. All the coupling lines $CP_1$~$CP_m$ are coupled to one common end. In this way, the voltages of all the coupling lines $CP_1$~$CP_m$ are controlled by controlling the voltage of the common end, and thus the voltages of all pixels in the LCD 200 will be affected by the coupling lines.

Referring to FIGS. 3 and 4, FIG. 3 is a diagram illustrating the LCD 200 adopting two-line inversion driving method, while FIG. 4 is a timing diagram illustrating the common end of the LCD 200 with coupling lines adopting two-line inversion method. In FIG. 4, T represents a period of time with a gate being turned on and the vertical axis represents a voltage level. The polarity of the voltage on the common end (compared to a common voltage level) changes in the same way as the data lines change. For example, when the polarity of the voltages of the data lines $D_1$~$D_m$ is negative (compared to the common voltage level), the polarity of the voltage on the common end is also negative, and when the polarity of the voltages of the data lines $D_1$~$D_m$ is positive (compared to the common voltage level), the polarity of the voltage on the common end is also positive.

Referring to FIGS. 5 and 6, FIG. 5 is a diagram illustrating the LCD 200 adopting two-line-dot inversion driving method, while FIG. 6 is a timing diagram illustrating the common end of the LCD 200 with coupling lines adopting two-line-dot inversion driving method. In FIG. 6, T represents a period of time with a gate being turned on and the vertical axis represents a voltage level. The polarity of the voltage on the common end (compared to a common voltage level) changes in the same way as a part of the data lines changes. When the two-line-dot inversion is adopted, the data lines are divided into two groups, each group having different polarity relative to the other. However, due to the couple lines connected to the common end, the polarity of the voltage on the common end only changes according to one of the two groups. For example, when the polarity of the voltages of the odd data lines $D_1$, $D_3$, $D_5$ . . . $D_{m-1}$ (assuming m is an even number) is negative (compared to the common voltage level), the polarity of the voltage on the common end is negative, and when the polarity of the voltages of the odd data lines $D_1$, $D_3$, $D_5$ . . . $D_{m-1}$ is positive (compared to the common voltage level), the polarity of the voltage on the common end is positive. In this way, the polarity of the voltage on the common end is not the same as the polarity of the even data lines $D_2$, $D_4$, $D_6$ . . . $D_m$. Consequently, the driving ability of the odd data lines is enhanced, but the even data lines is reduced. This causes non-uniformity on the LCD 200, as shown in FIG. 7, and color difference in stripe shape is generated. Therefore, the conventional LCD 200 cannot adopt the two-line-dot inversion driving method.

SUMMARY OF THE INVENTION

The present invention provides an LCD with data compensation function. The LCD comprises a plurality of gate lines, a plurality of first data lines for transmitting first data, a plurality of second data lines for transmitting second data, a pixel array comprising a plurality of pixels wherein the plurality of the pixels are interwoven by the gate lines, the plurality of the first data lines, and the plurality of the second data lines, a first common end carrying a first voltage, a second common end carrying a second voltage, a plurality of first coupling lines near the plurality of the first data lines coupled to the first common end, and a plurality of second coupling lines near the plurality of the second data lines coupled to the second common end, wherein the first and the second common ends are electrically isolated, and one coupling line of the first or the second coupling lines is disposed between two adjacent data lines of the first or the second data lines.

The present invention further provides a method for compensating data of an LCD. The LCD comprises a plurality of gate lines, a plurality of first data lines, a plurality of second data lines, a pixel array, a first common end, a second common end, a plurality of first coupling lines, and a plurality of second coupling lines, the plurality of the first data lines transmitting first data, the plurality of the second data lines transmitting second data, the pixel array comprising a plurality of pixels, wherein the plurality of pixels are interwoven by the plurality of the gate lines, the plurality of the first data lines, and the plurality of the second data lines, the first coupling lines coupled to the first common end near the plurality of the first data lines, the second coupling lines coupled to the second common end near the plurality of the second data lines, the first common end carrying a first voltage, the second common end carrying a second voltage, the first common end electrically isolated from the second common end. The method comprises adjusting the first voltage to compensate the plurality of the first data lines according to the first data, and adjusting the second voltage to compensate the plurality of the second data lines according to the first data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
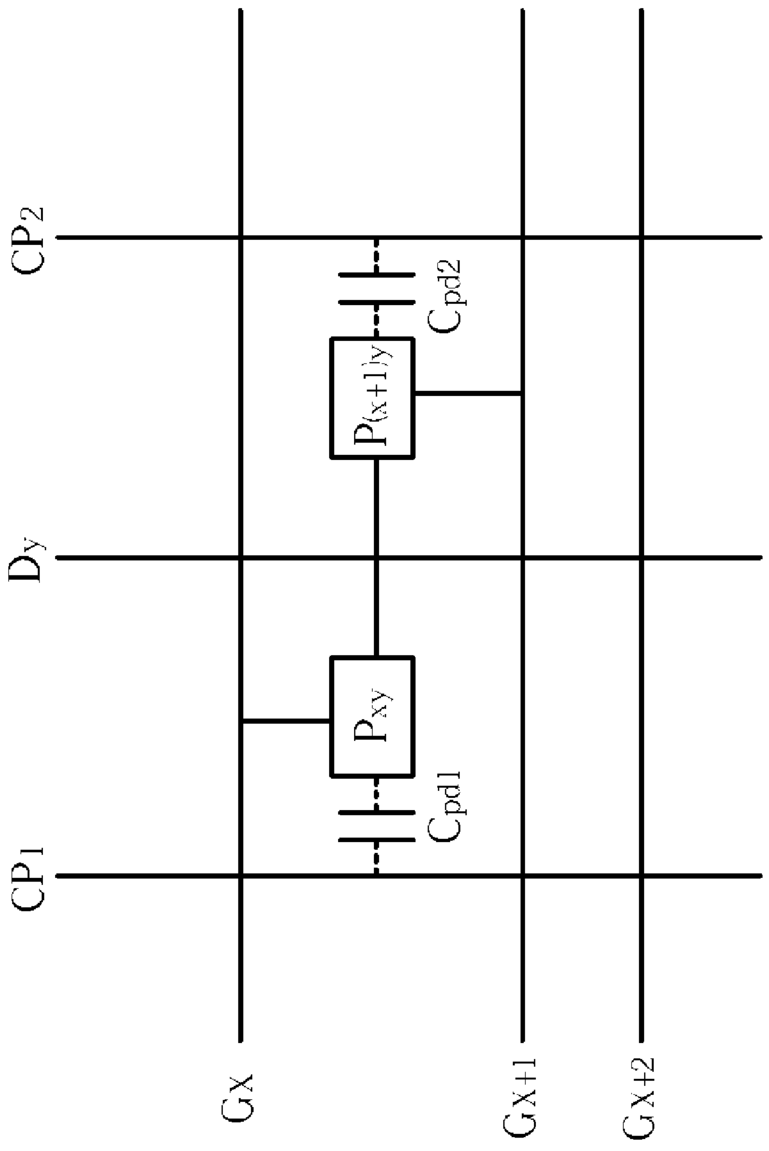
FIG. 1 PRIOR ART
FIG. 1 is a diagram illustrating coupling lines of a conventional LCD.
Figure 2:
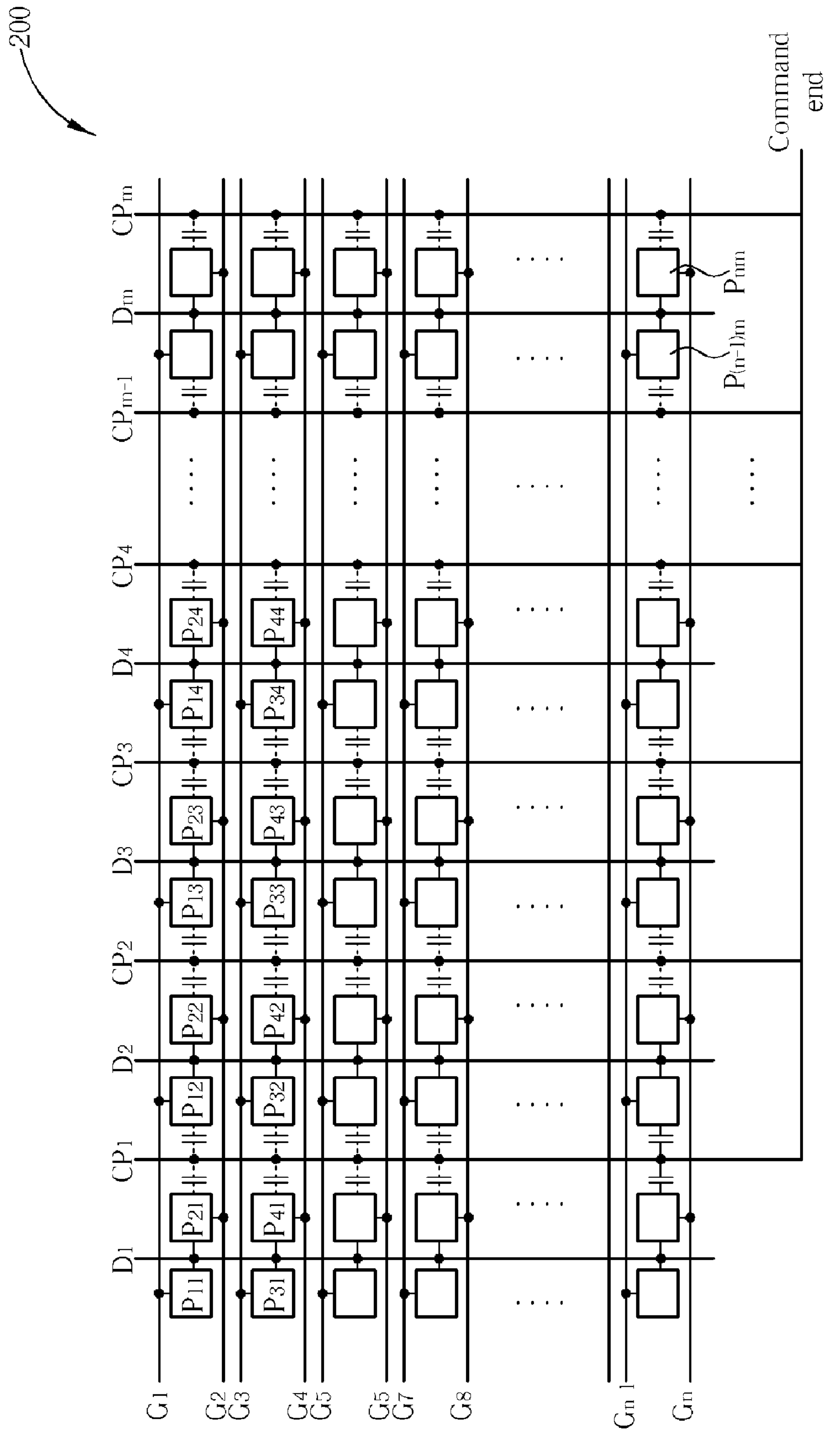
FIG. 2 PRIOR ART
FIG. 2 is a diagram illustrating a conventional LCD with data compensation function.
Figure 3:
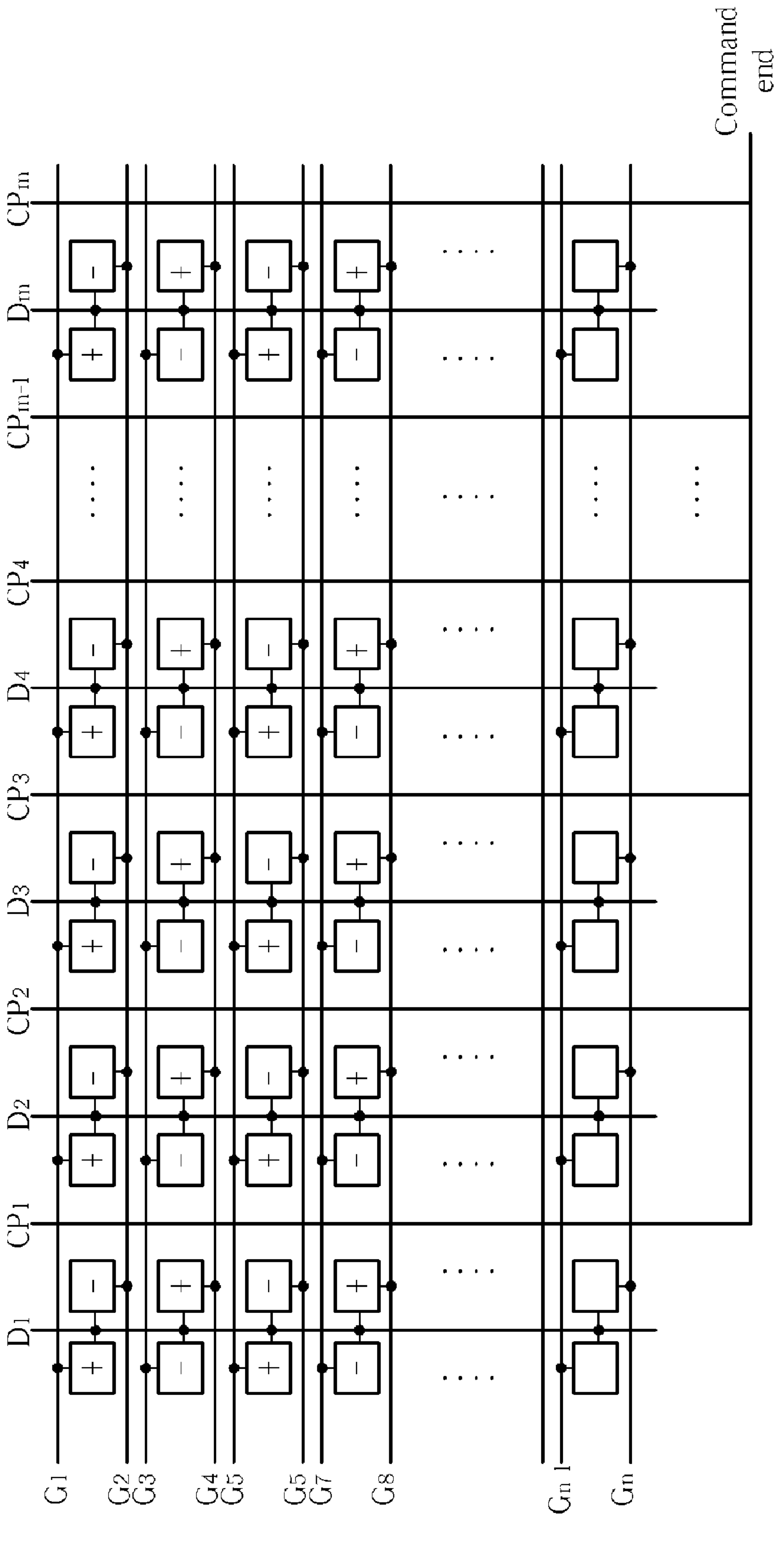
FIG. 3 PRIOR ART
FIG. 3 is a diagram illustrating the conventional LCD with coupling lines adopting two-line inversion.
Figure 4:
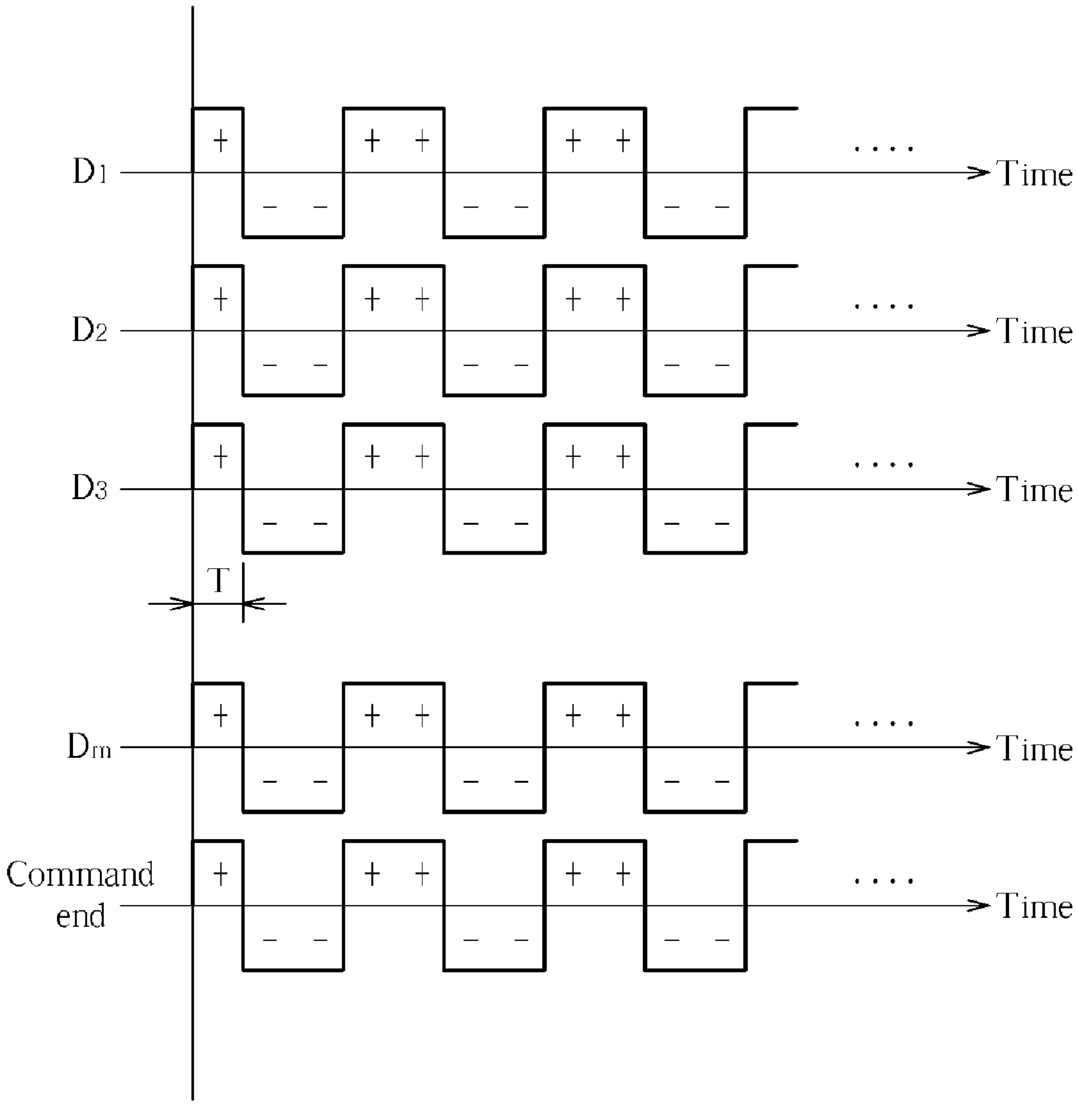
FIG. 4 PRIOR ART
FIG. 4 is a timing diagram illustrating the common end of the conventional LCD with coupling lines adopting two-line inversion.
Figure 5:
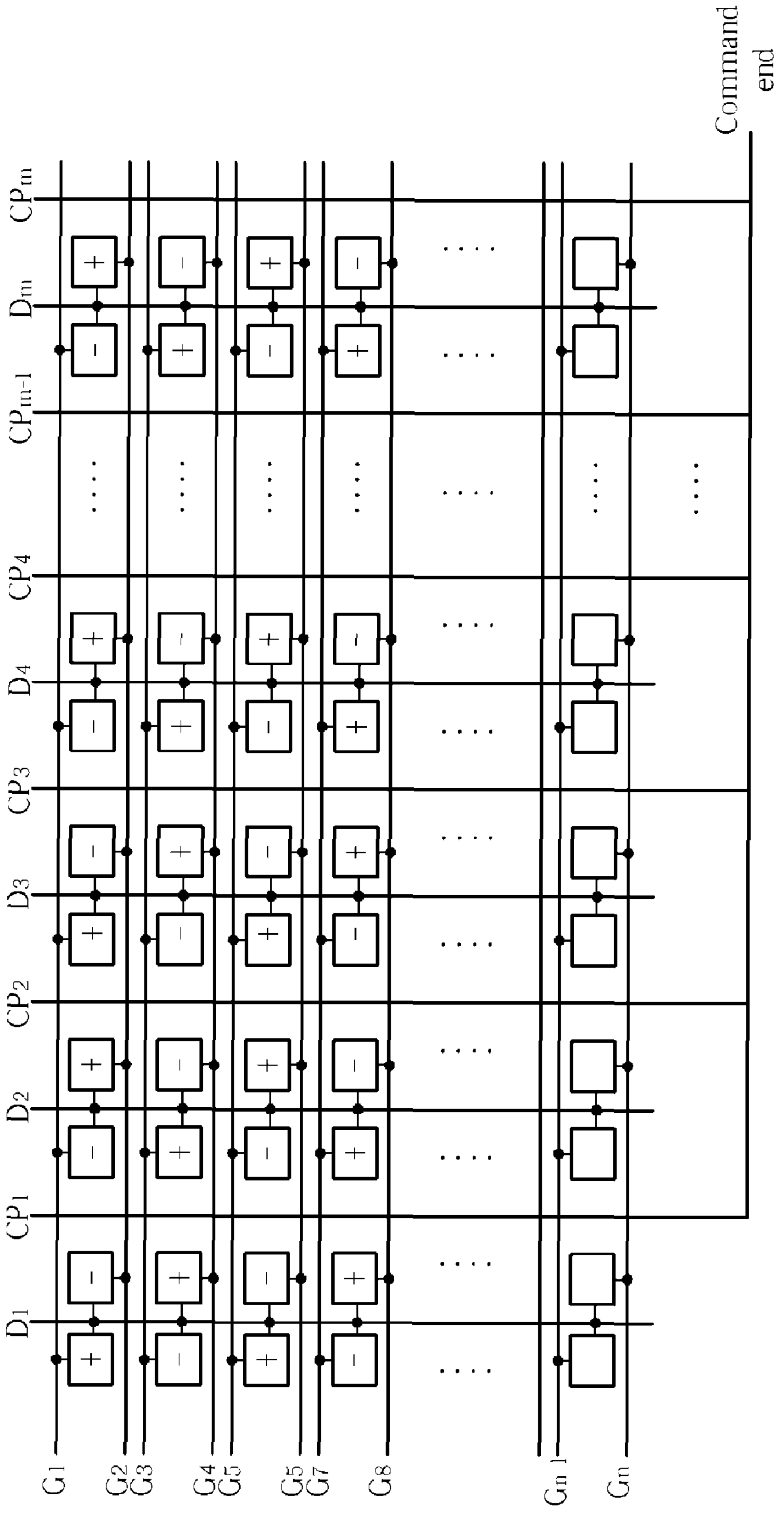
FIG. 5 PRIOR ART
FIG. 5 is a diagram illustrating the conventional LCD with couple lines adopting two-line-dot inversion.
Figure 6:
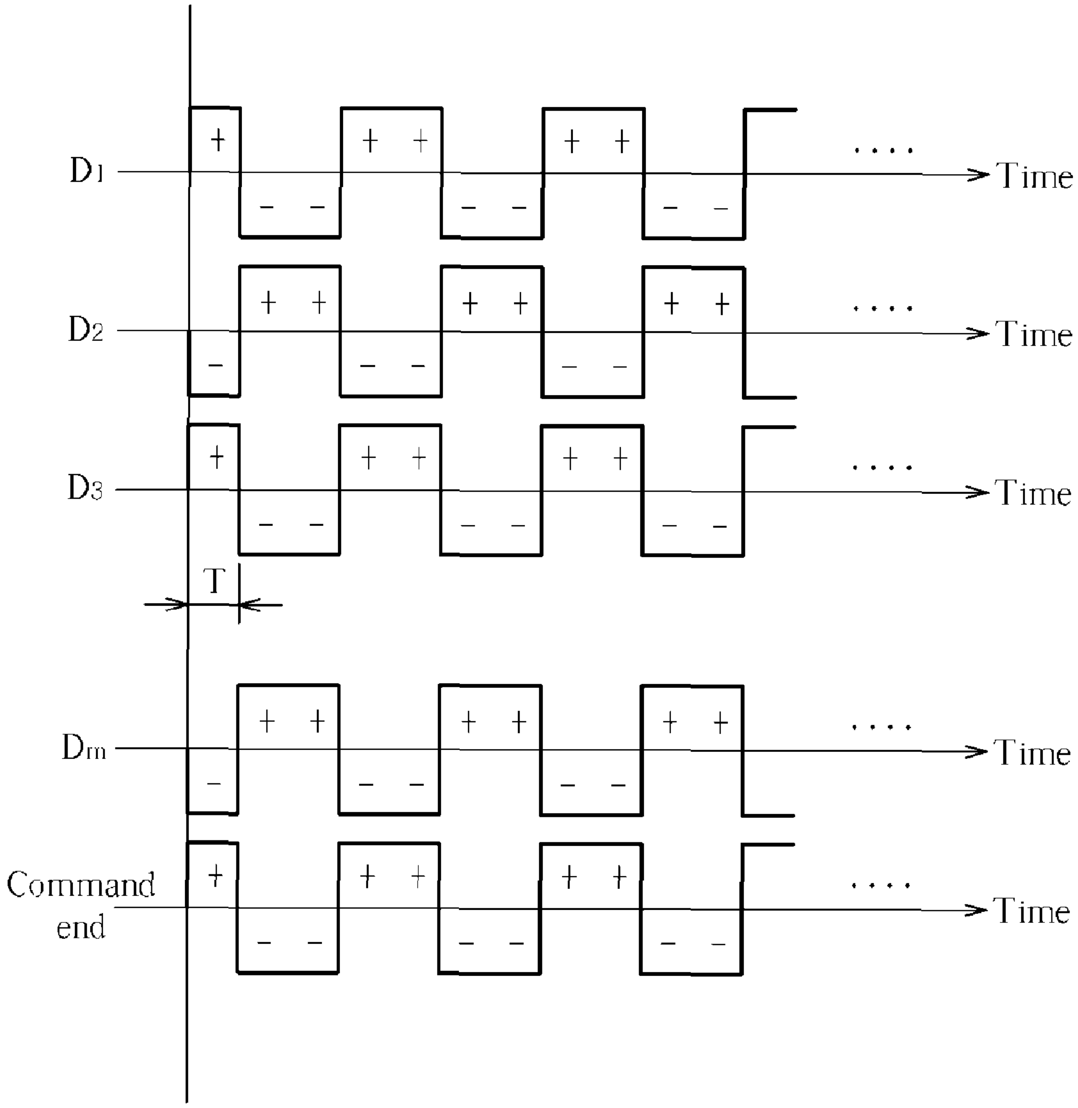
FIG. 6 PRIOR ART
FIG. 6 is a timing diagram illustrating the common end of the conventional LCD with couple lines adopting two-line-dot inversion.
Figure 7:
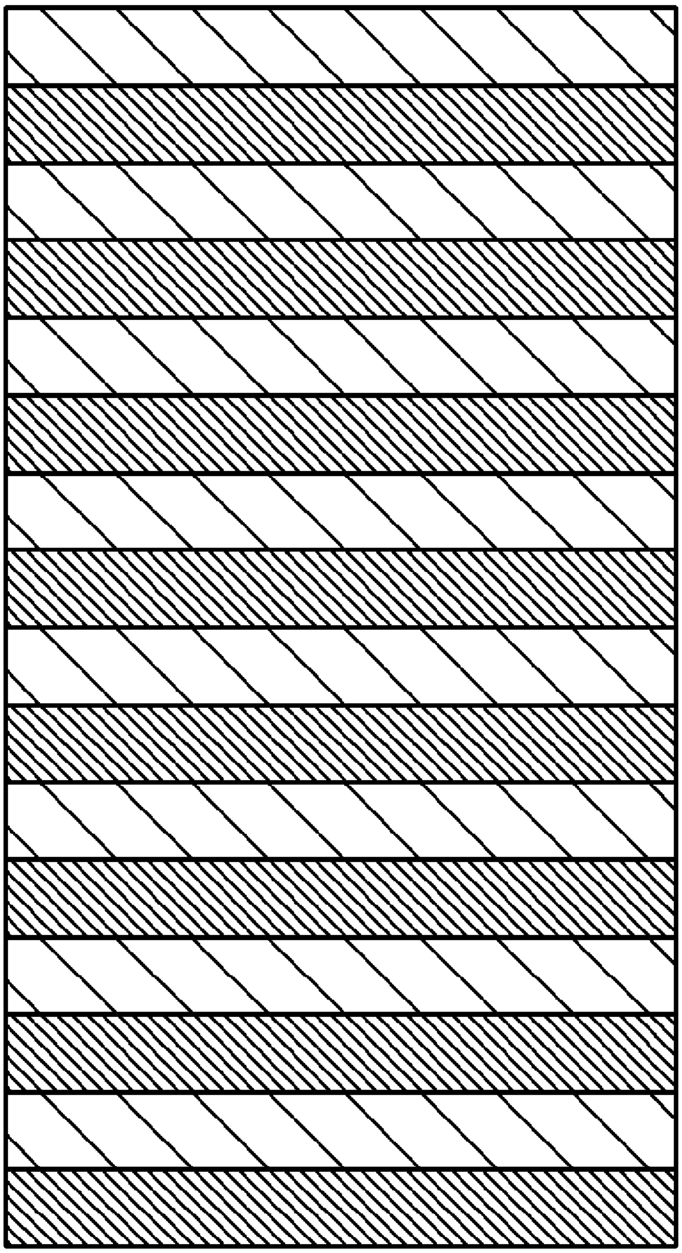
FIG. 7 PRIOR ART
FIG. 7 is a diagram illustrating frames displayed by the conventional LCD under the two-line-dot inversion.
Figure 8:
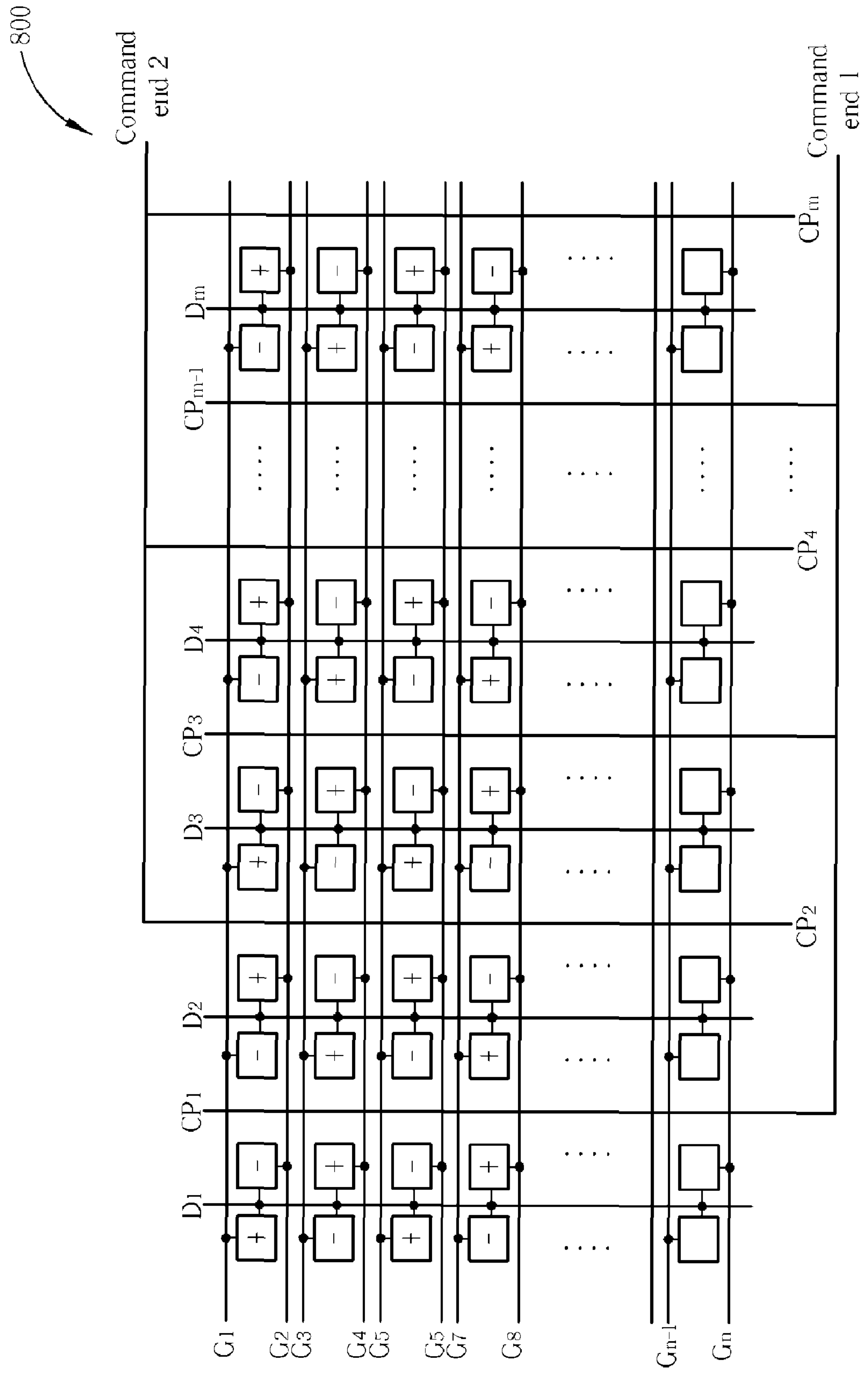
FIG. 8 is a diagram illustrating an LCD with data compensation function of the present invention.

FIG. 8 is a diagram illustrating an LCD with data compensation function of the present invention. As shown in FIG. 8, the coupling lines $CP_1$~$CP_m$ are divided into two groups. The odd coupling lines $CP_1$, $CP_3$, $CP_5$ . . . $CP_{m-1}$ are coupled to the common end 1, and the even coupling lines $CP_2$, $CP_4$, $CP_6$ . . . $CP_m$ are coupled to the common end 2. In this way, when the LCD 800 adopts two-line inversion driving method, the polarity of the common end 1 and the polarity of the common end 2 change the same way as all the data lines $D_1$~$D_m$. Thus the coupling lines $CP_1$~$CP_{m-1}$ change the same way as all the data lines $D_1$~$D_m$ and help the data lines $D_1$~$D_m$ to drive pixels. When the LCD 800 adopts two-line-dot inversion, the polarity of the common end 1 changes the same way as the odd data lines $D_1$, $D_3$, $D_5$ . . . $D_{m-1}$ and the polarity of the common end 2 changes the same way as the even data lines $D_2$, $D_4$, $D_6$ . . . $D_m$. Thus the coupling lines $CP_1$, $CP_3$, $CP_5$ . . . $CP_{m-1}$ change the same way as the odd data lines $D_1$, $D_3$, $D_5$ . . . $D_{m-1}$ and help the odd data lines $D_1$, $D_3$, $D_5$ . . . $D_{m-1}$ to drive pixels, and the coupling lines $CP_2$, $CP_4$, $CP_6$ . . . $CP_m$ change the same way as the even data lines $D_2$, $D_4$, $D_6$ . . . $D_m$ and help the even data lines $D_2$, $D_4$, $D_6$ . . . $D_m$ to drive pixels. Therefore, all the driving abilities of the data lines are enhanced, and the color difference in stripe shape is solved.

Figure 9:
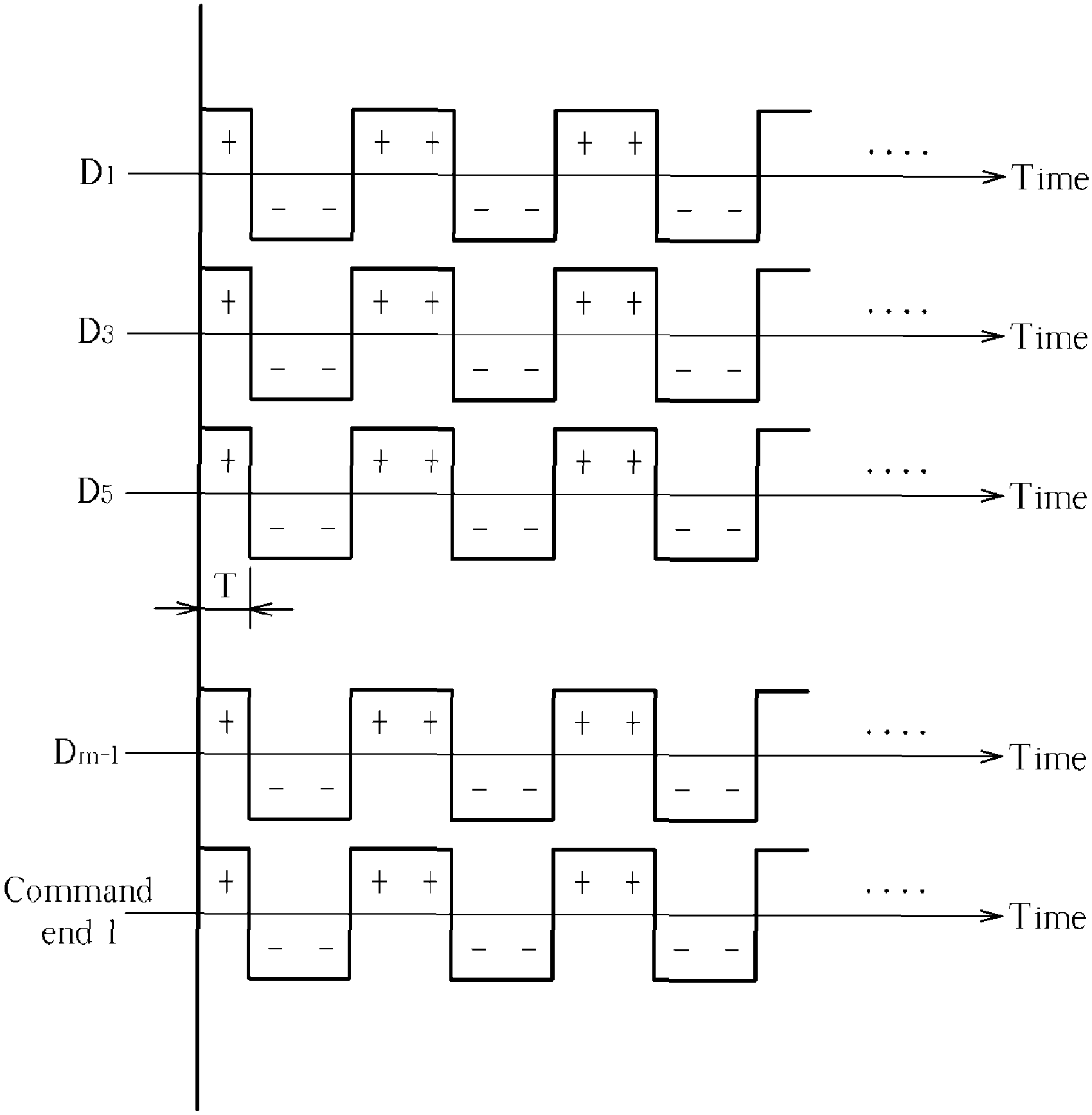
FIG. 9 is a timing diagram illustrating one common end of the LCD, according to the present invention, for driving the coupling lines according to the characteristic of the odd data lines.
Figure 10:
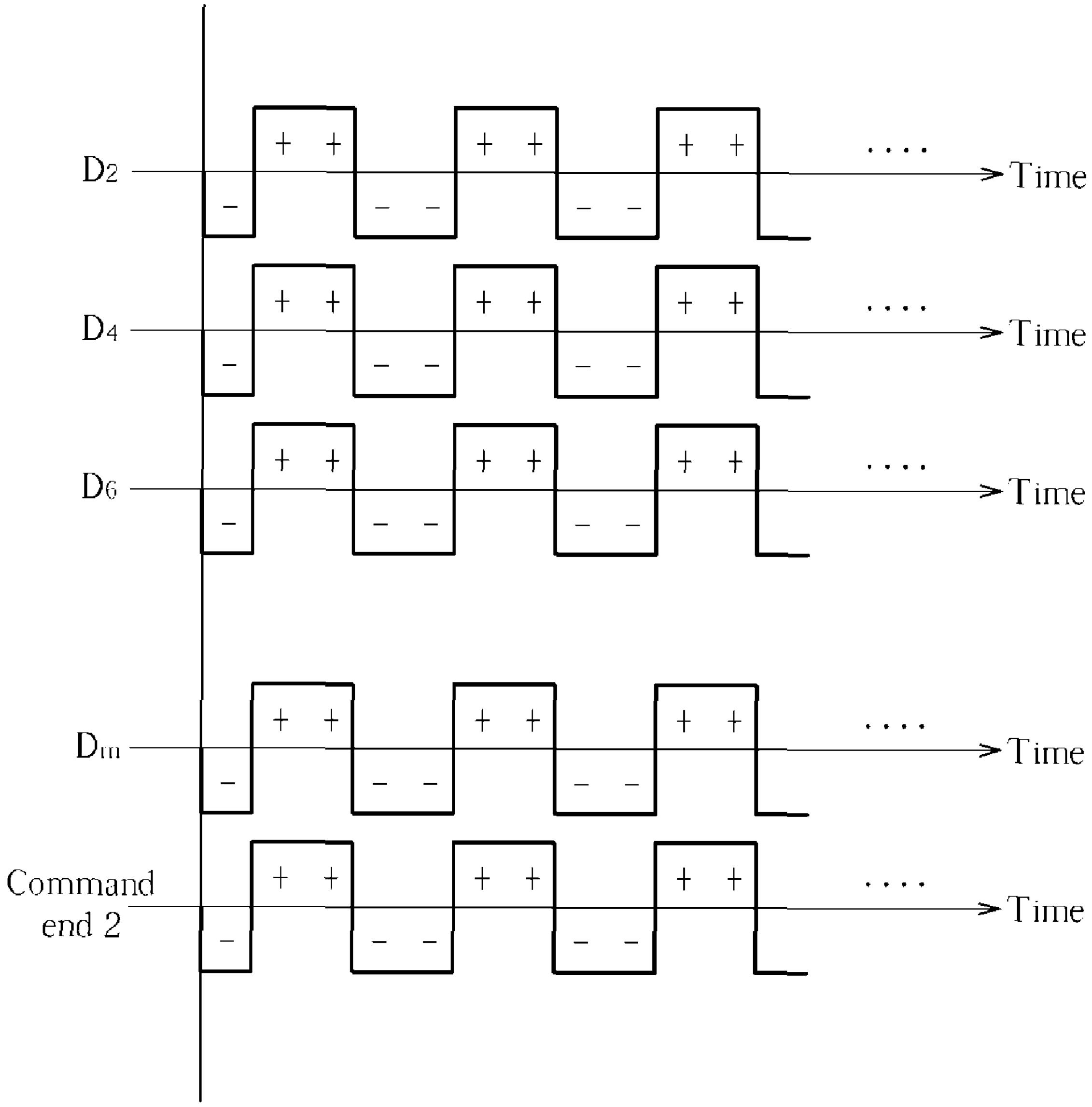
FIG. 10 is a timing diagram illustrating another common end of the LCD, according to the present invention, for driving the coupling lines according to the characteristic of the even data lines.

Referring to FIGS. 9 and 10, FIG. 9 is a timing diagram illustrating the common end 1 of the LCD 800 of the present invention driving the coupling lines $CP_1$, $CP_3$, $CP_5$ . . . $CP_{m-1}$ according to the characteristic of the odd data lines $D_1$, $D_3$, $D_5$ . . . $D_{m-1}$, while FIG. 10 is a timing diagram illustrating the common end 2 of the LCD 800 of the present invention driving the coupling lines $CP_2$, $CP_4$, $CP_6$ . . . $CP_m$ according to the characteristic of the even data lines $D_2$, $D_4$, $D_6$ . . . $D_m$. As shown in FIG. 9, the polarity of the voltage on the common end 1 (compared to the common voltage level) changes the same way as the odd data lines $D_1$, $D_3$, $D_5$ . . . $D_m$ change. When the polarities of the voltages on the odd data lines $D_1$, $D_3$, $D_5$ . . . $D_{m-1}$ are positive (compared to the common voltage level), the polarity of the voltage on the common end 1 is positive, and when the polarities of the voltages on the odd data lines $D_1$, $D_3$, $D_5$ . . . $D_{m-1}$ are negative (compared to the common voltage level), the polarity of the voltage on the common end 1 is negative. As shown in FIG. 10, the polarity of the voltage on the common end 2 (compared to the common voltage level) changes the same way as the even data lines $D_2$, $D_4$, $D_6$ . . . $D_m$ change. When the polarities of the voltages on the even data lines $D_2$, $D_4$, $D_6$ . . . $D_m$ are positive (compared to the common voltage level), the polarity of the voltage on the common end 2 is positive, and when the polarities of the voltages on the even data lines $D_2$, $D_4$, $D_6$ . . . Dm are negative (compared to the common voltage level), the polarity of the voltage on the common end 2 is negative.

Figure 11:
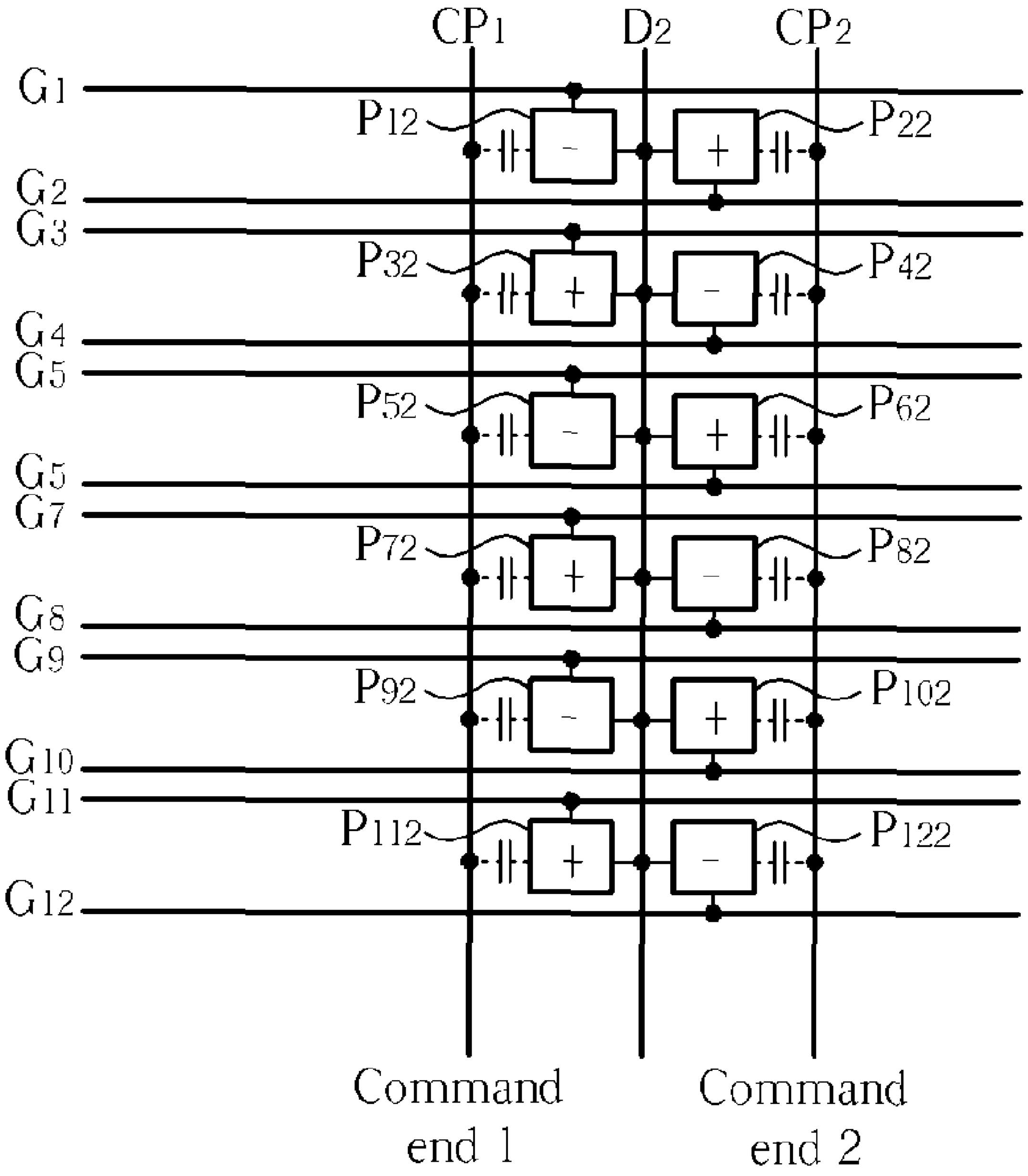
FIG. 11 is a diagram illustrating the coupling lines disposed at sides of the data line for data compensating, according to the present invention.
Figure 12:
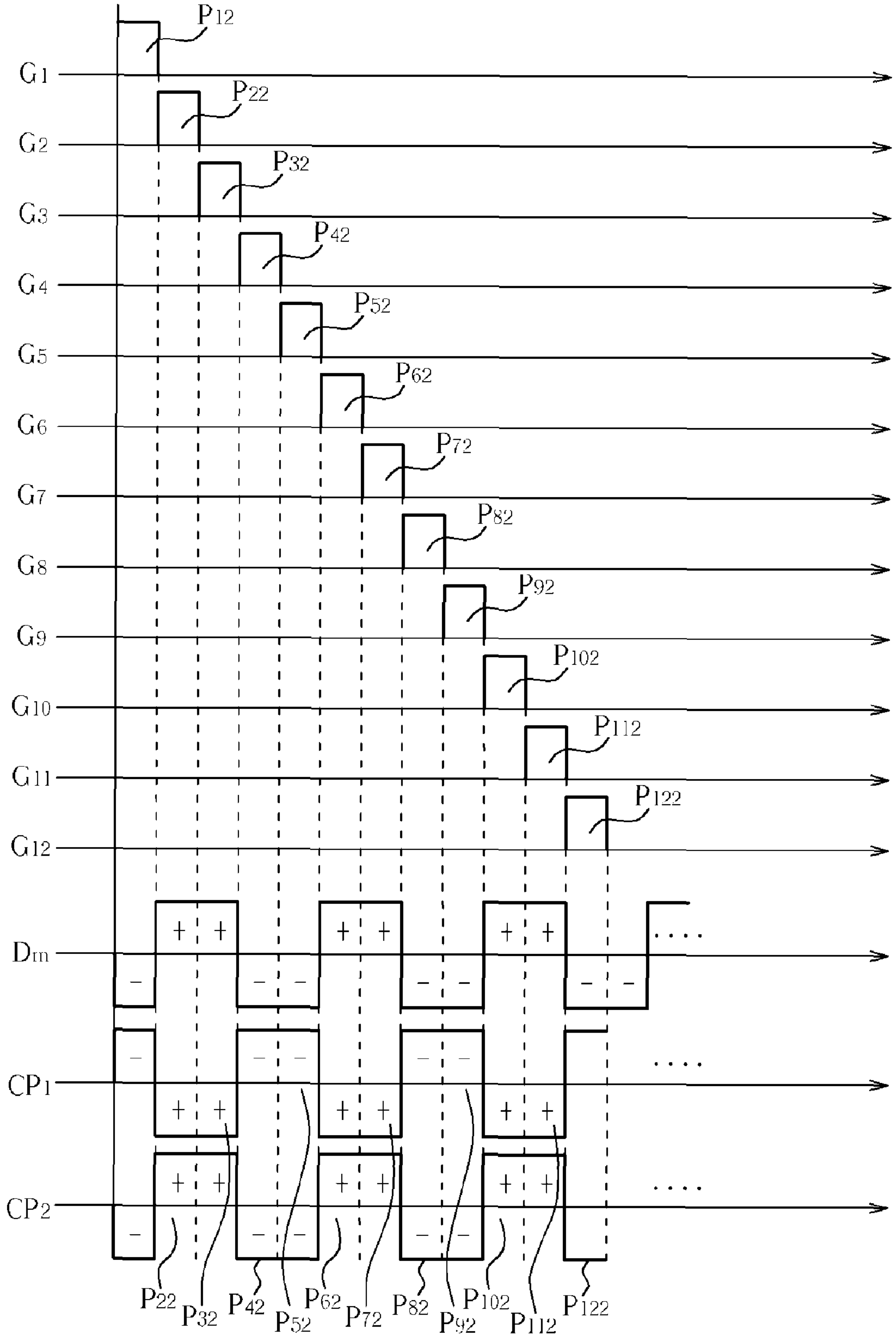
FIG. 12 is a timing diagram illustrating voltages on the coupling lines, according to the present invention.

Referring to FIGS. 11 and 12, FIG. 11 is a diagram illustrating the coupling lines $CP_1$ and $CP_2$ disposed at sides of the data line $D_2$ for data compensating, while FIG. 12 is a timing diagram illustrating voltages on the coupling lines $CP_1$ and $CP_2$. As shown in FIG. 11, the parasitic capacitors generated by the coupling line $CP_1$ respectively affect the pixels $P_{12}$, $P_{32}$, $P_{52}$, $P_{72}$, $P_{92}$, $P_{112}$ . . . and so on, and the parasitic capacitors generated by the coupling line $CP_2$ respectively affect the pixels $P_{22}$, $P_{42}$, $P_{62}$, $P_{82}$, $P_{102}$, $P_{122}$ . . . and so on. As shown in FIG. 12, when the gate driving signal on the gate line $G_2$ is turned on, the pixel $P_{22}$ is coupled to the data line $D_2$ for transmitting the data on the data line $D_2$ to the pixel $P_{22}$. Meanwhile, the voltage on the data line $D_2$ is changing from negative to positive (as shown in FIG. 11, the voltage on the data line $D_2$ is negative at the period when the gate driving signal on the gate line $G_1$ is turned on). Therefore, the voltage on the coupling line $CP_2$ is also positive to help the data line $D_2$ so as to hurry the pixel $P_{22}$ to the predetermined voltage level. When the gate driving signal on the gate line $G_3$ is turned on, the pixel $P_{32}$ is coupled to the data line $D_2$ for transmitting the data on the data line $D_2$ to the pixel $P_{32}$. Meanwhile, the voltage on the data line $D_2$ is changing from positive to positive (as shown in FIG. 11, the voltage on the data line $D_2$ is positive at the period when the gate driving signal on the gate line $G_2$ is turned on). Therefore, the voltage on the coupling line $CP_1$ is negative to help the data line $D_2$ so as to avoid the pixel $P_{32}$ exceeding the predetermined voltage level. When the gate driving signal on the gate line $G_4$ is turned on, the pixel $P_{42}$ is coupled to the data line $D_2$ for transmitting the data on the data line $D_2$ to the pixel $P_{42}$.

Meanwhile, the voltage on the data line $D_2$ is changing from positive to negative (as shown in FIG. 11, the voltage on the data line $D_2$ is positive at the period when the gate driving signal on the gate line $G_3$ is turned on). Therefore, the voltage on the coupling line $CP_2$ is negative so that the data line $D_2$ may accelerate the pixel $P_{42}$ to reach the predetermined voltage level. When the gate driving signal on the gate line $G_5$ is turned on, the pixel $P_{52}$ is coupled to the data line $D_2$ for transmitting the data on the data line $D_2$ to the pixel $P_{52}$. Meanwhile, the voltage on the data line $D_2$ is changing from negative to negative (as shown in FIG. 11, the voltage on the data line $D_2$ is negative at the period when the gate driving signal on the gate line $G_4$ is turned on). Therefore, the voltage on the coupling line $CP_1$ is positive to help the data line $D_2$ so as to avoid the pixel $P_{52}$ exceeding the predetermined voltage level. The operations of the rest of the pixels can be inferred by the described above. It is known by the description above that the driving characteristics of the coupling line $CP_1$ is same as that of the data line $D_1$, and the driving characteristics of the coupling line $CP_2$ is same as that of the data line $D_2$. It is further explained that the coupling lines $CP_1$, $CP_3$, $CP_5$ . . . $CP_{m-1}$ are disposed near the odd data lines $D_1$, $D_3$, $D_5$ . . . $D_{m-1}$ and the coupling lines $CP_1$, $CP_3$, $CP_5$ . . . $CP_{m-1}$ are coupled to a common end 1 having same driving characteristics as the odd data lines $D_1$, $D_3$, $D_5$ . . . $D_{m-1}$, and the coupling lines $CP_2$, $CP_4$, $CP_6$ . . . $CP_m$ are disposed near the even data lines $D_2$, $D_4$, $D_6$ . . . Dm and the coupling lines $CP_2$, $CP_4$, $CP_6$ . . . $CP_m$ are coupled to a common end 2 having same driving characteristics as the even data lines $D_2$, $D_4$, $D_6$ . . . $D_m$. In this way, driving ability of each data line is efficiently enhanced and the LCD 800 has better data compensating function, which improves the problem of color difference in strip shape.

Figure 13:
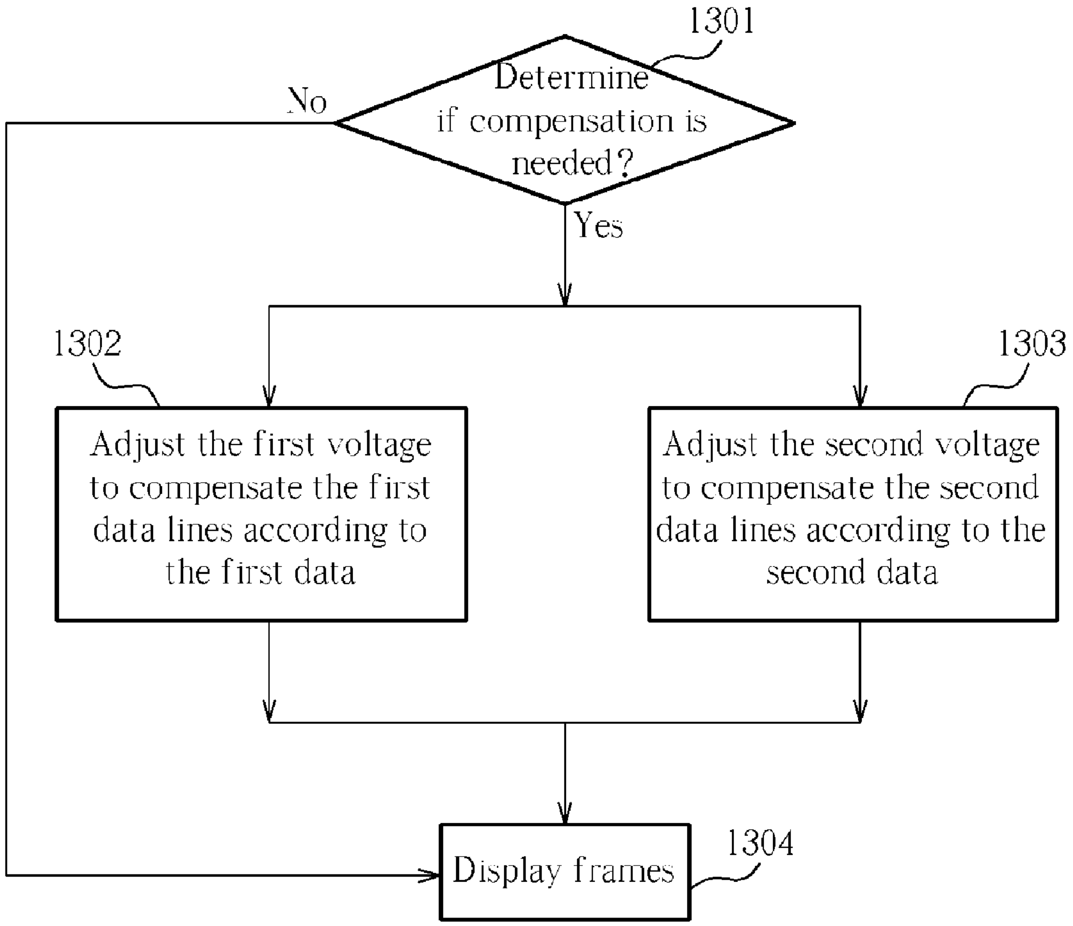
FIG. 13 is a flowchart illustrating the method of displaying frames according to the LCD with data compensation function of the present invention.

FIG. 13 is a flowchart illustrating the method of displaying frames according to the LCD with data compensation function of the present invention. The step 1301 determines if the compensation is needed. If not, the frame is directly displayed (step 1304). If so, the step 1302 is executed onto the plurality of first data lines and the step 1303 is executed onto the plurality of second data lines. In step 1302, a first voltage is adjusted according to the first data, thus the common end 1 carries the first voltage, and then the first voltage is transmitted to the coupling lines ($CP_1$, $CP_3$, $CP_5$ . . . $CP_{m-1}$) corresponding to the plurality of the first data lines so that the corresponding coupling lines carry the first voltage and generate capacitor coupling effect for compensating the plurality of the first data lines. In step 1303, a second voltage is adjusted according to the second data, thus the common end 2 carries the second voltage, and then the second voltage is transmitted to the coupling lines ($CP_2$, $CP_4$, $CP_6$ . . . $CP_m$) corresponding to the plurality of the second data lines so that the corresponding coupling lines carry the second voltage and generate capacitor coupling effect for compensating the plurality of the second data lines. After finishing the steps 1302 and 1303, the compensated frame is displayed (step 1304). Additionally, the step 1302 comprises adjusting the first voltage to be higher/lower than a predetermined voltage level when the first data is higher/lower than the predetermined voltage level so as to compensate the first data lines, and the step 1303 comprises adjusting the second voltage to be higher/lower than a predetermined voltage level when the second data is higher/lower than the predetermined voltage level so as to compensate the second data lines.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display (LCD) with data compensating function comprising:
- a plurality of gate lines;
- a plurality of first data lines for transmitting first data;
- a plurality of second data lines for transmitting second data;
- a pixel array comprising a plurality of pixels wherein the plurality of the pixels are interwoven by the gate lines, the plurality of the first data lines, and the plurality of the second data lines;
- a first common end carrying a first voltage;
- a second common end carrying a second voltage;
- a plurality of first coupling lines near the plurality of the first data lines coupled to the first common end, for transmitting a first compensation data with a first polarity disposed between the first data lines and the second data lines and arranged along the first data lines; and
- a plurality of second coupling lines near the plurality of the second data lines coupled to the second common end, for transmitting a second compensation data with a second polarity disposed between the second data lines and the first data lines and arrange along the second data lines;
- wherein the first and second coupling lines are electrically isolated from the pluralities of first and second data lines at all time and the first compensation data and the second compensation data have different polarity.

2. The LCD of claim 1, wherein one of the first data lines is coupled to at least one column of pixels of the pixel array, and one of the second data lines is coupled to at least one column of pixels of the pixel array.

3. The LCD of claim 2, wherein when a first data voltage is higher than a predetermined voltage level, the first voltage is adjusted to be higher than the predetermined voltage level to compensate the plurality of the first data lines.

4. The LCD of claim 2, wherein when the first data voltage is lower than a predetermined voltage level, the first voltage is adjusted to be lower than the predetermined voltage level to compensate the plurality of the first data lines.

5. A method for compensating data of an LCD, the LCD comprising a plurality of gate lines, a plurality of first data lines, a plurality of second data lines, a pixel array, a first common end, a second common end, a plurality of first coupling lines, and a plurality of second coupling lines, the plurality of the first data lines transmitting first data, the plurality of the second data lines transmitting second data, the pixel array comprising a plurality of pixels, wherein the plurality of pixels are interwoven by the plurality of the gate lines, the plurality of the first data lines, and the plurality of the second data lines, the first coupling lines coupled to the first common end near the plurality of the first data lines, the second coupling lines coupled to the second common end near the plurality of the second data lines, the first and second coupling lines electrically isolated from the pluralities of first and second data lines at all time, the first common end carrying a first voltage, the second common end carrying a second voltage, the first common end electrically isolated to the second common end at all time, the method comprising:
- transmitting a first compensation data with a first polarity disposed between the first data lines and the second data lines;
- adjusting the first voltage to compensate the plurality of the first data lines according to the first data;

transmitting a second compensation data with a second polarity disposed between the second data lines and the first data lines and arrange along the second data lines; and adjusting the second voltage to compensate the plurality of the second data lines according to the second data;

wherein the first compensation data and the second compensation data have different polarity.

6. The method of claim 5, wherein adjusting the first voltage to compensate the plurality of the first data lines according to the first data comprises when a first data voltage is higher than a predetermined voltage level, adjusting the first voltage to be higher than the predetermined voltage level to compensate the plurality of the first data lines.

7. The method of claim 5, wherein adjusting the first voltage to compensate the plurality of the first data lines according to the first data comprises when a first data voltage is lower than a predetermined voltage level, adjusting the first voltage to be lower than the predetermined voltage level to compensate the plurality of the first data lines.

8. The method of claim 5, wherein adjusting the second voltage to compensate the plurality of the second data lines according to the second data comprises when a second data voltage is higher than a predetermined voltage level, adjusting the second voltage to be higher than the predetermined voltage level to compensate the plurality of the second data lines.

9. The method of claim 5, wherein adjusting the second voltage to compensate the plurality of the second data lines according to the second data comprises when a second data voltage is lower than a predetermined voltage level, adjusting the second voltage to be lower than the predetermined voltage level to compensate the plurality of the second data lines.

10. The LCD of claim 1, wherein the first data and the second data have different polarity, the first data lines and the first compensation data have same polarity, and the second data lines and the second compensation data have same polarity.

11. The method of claim 5, wherein the first data and the second data have different polarity, the first data lines and the first compensation data have same polarity, and the second data lines and the second compensation data have same polarity.

* * * * *